United States Patent
Zhang et al.

(10) Patent No.: US 8,968,960 B2
(45) Date of Patent: Mar. 3, 2015

(54) REVERSAL TOLERANT MEMBRANE ELECTRODE ASSEMBLY FOR A FUEL CELL

(75) Inventors: Hao Zhang, Burnaby (CA); Herwig Haas, Vancouver (CA); Andrew Leow, Delta (CA); Mike Davis, Port Coquitlam (CA); Richard Fellows, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 710 days.

(21) Appl. No.: 13/143,372

(22) PCT Filed: Jan. 8, 2010

(86) PCT No.: PCT/US2010/020466
§ 371 (c)(1),
(2), (4) Date: Jul. 6, 2011

(87) PCT Pub. No.: WO2010/080975
PCT Pub. Date: Jul. 15, 2010

(65) Prior Publication Data
US 2011/0269057 A1    Nov. 3, 2011

Related U.S. Application Data

(60) Provisional application No. 61/193,913, filed on Jan. 8, 2009.

(51) Int. Cl.
*H01M 4/92* (2006.01)
*H01M 8/10* (2006.01)
*H01M 4/48* (2010.01)
(Continued)

(52) U.S. Cl.
CPC .......... *H01M 8/1004* (2013.01); *H01M 4/8642* (2013.01); *H01M 4/8647* (2013.01); *H01M 4/8807* (2013.01); *H01M 4/92* (2013.01); *H01M 2004/8684* (2013.01); *Y02E 60/521* (2013.01)
USPC ........... 429/487; 429/488; 429/523; 429/526; 429/535

(58) Field of Classification Search
USPC .......... 429/487, 488, 489, 484, 523, 526, 535
See application file for complete search history.

(56) References Cited

U.S. PATENT DOCUMENTS 5,660,941 A    8/1997  Farooque et al.
6,613,464 B1   9/2003  Wilkinson et al.
(Continued)

FOREIGN PATENT DOCUMENTS

EP    1212805 B1    12/2003
JP    2007242415 A   9/2007
(Continued)

OTHER PUBLICATIONS

Supplementary European Search Report dated Jun. 6, 2012.

*Primary Examiner* — Patrick Ryan
*Assistant Examiner* — Julian Anthony
(74) *Attorney, Agent, or Firm* — Patent Central LLC; Stephan A. Pendorf (57) ABSTRACT

Ruthenium or a Ruthenium compound is applied to an anode structure according to a predetermined pattern, with only part of the anode active area containing Ru. The parts of the MEA that do not contain Ru are not expected to suffer degradation from Ru cross-over, so that overall degradation of the cell will be diminished. Having less precious metals will also translate into less cost.

6 Claims, 6 Drawing Sheets

(51) Int. Cl.
  *H01M 4/02* (2006.01)
  *H01M 4/36* (2006.01)
  *H01M 8/00* (2006.01)
  *H01M 4/86* (2006.01)
  *H01M 4/88* (2006.01)

(56) References Cited

U.S. PATENT DOCUMENTS 6,936,370 B1 * 8/2005 Knights et al. ............. 429/482
7,608,358 B2 * 10/2009 Ye ............................... 429/535

2004/0013935 A1   1/2004   Ye et al.
2005/0095494 A1   5/2005   Fuss et al.
2006/0269824 A1   11/2006  Hampden-Smith et al.
2008/0187813 A1   8/2008   Ye
2008/0292942 A1   11/2008  You et al.
2009/0246587 A1   10/2009  Kato

FOREIGN PATENT DOCUMENTS

JP    2008091101 A    4/2008
WO    0115247 A2      3/2001

* cited by examiner

REVERSAL TOLERANT MEMBRANE ELECTRODE ASSEMBLY FOR A FUEL CELL

The present invention is directed to a membrane electrode assembly (MEA) for a fuel cell which exhibits enhanced reversal tolerance. In particular, the invention provides an MEA configuration in which a layer of Ruthenium or a Ruthenium compound is provided on the anode to electrolyze available water and pass the majority of the current during a reversal of the fuel cell, thereby preventing damage to the MEA.

BACKGROUND OF THE INVENTION

"Reversal" of a fuel cell (in which the cell operates in a regenerative manner, consuming electricity and, for example, electrolyzing water to produce hydrogen and oxygen) can occur during normal fuel cell operation due to "fuel starvation" attributable to poor flow sharing, or to low fuel flow. Fuel starvation can also occur during a shutdown event when the anode is purged with air (to leave the stack in a safe situation or in preparation for freeze start) and load is drawn to additionally bleed down cell voltages. Between start-up and shutdown (if $H_2$ is not purged from the anode) air will permeate into the anode and consume $H_2$ due to small leaks and/or cross-over from the cathode. On the resulting start-up, the exchange of air on the anode with $H_2$ and subsequent load will result in fuel starvation at the cell outlet.

In conventional fuel cells which utilize, for example a platinum based anode catalyst, without any provision for reversal tolerance, cell reversal can cause damage to the anode, due to carbon oxidation. Accordingly, it is known to include additional measures which provide the MEA with a degree of "reversal tolerance", thereby avoiding damage to the MEA.

Figure 1:
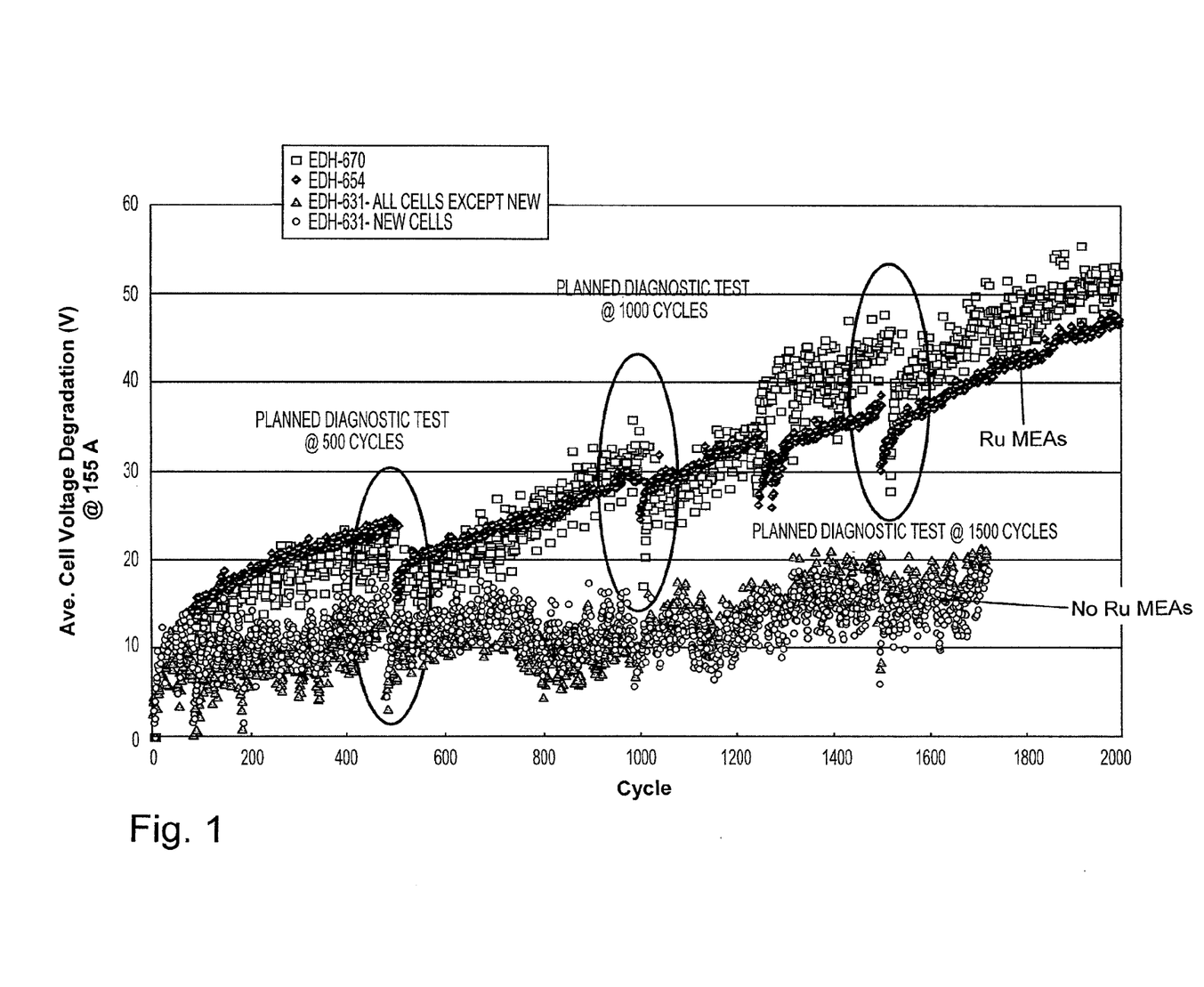
FIG. 1 graphically shows the loss in performance with Ruthenium crossover.

One known technique for achieving reversal tolerance, for example, is to provide a Pt/Ru alloy or admix over the entire surface of the anode structure. However, while this MEA configuration is easy to manufacture, it has a number of disadvantages which render it less than ideal. First, among these is that during operation of the fuel cell, the Ruthenium which is applied to the anode can gradually migrate from the anode to the cathode, which over time can contribute substantially to a degradation of the fuel cell output voltage, as can be seen in FIG. 1. Moreover, this technique also requires an excessive amount of costly precious metal.

SUMMARY OF THE INVENTION

Accordingly, one object of the invention is to provide an MEA structure that achieves satisfactory reversal tolerance, while avoiding the disadvantages described above.

Another object of the invention is to provide an MEA structure which achieves optimal results while decreasing long term degradation due to the cross-over of Ruthenium from the anode to the cathode.

Still another object of the invention is to provide such an MEA structure which reduces the amount of Ru that is required to achieve satisfactory reversal tolerance, thereby minimizing cost.

These and other objects and advantages are achieved by the method and apparatus according to the invention, in which Ruthenium or a Ruthenium compound is applied to the anode structure according to a predetermined pattern, with only part of the anode active area containing Ru. The parts of the MEA that do not contain Ru are not expected to suffer degradation from Ru cross-over, so that overall degradation of the cell will be diminished. Having less precious metals will also translate into less cost (given an appropriate manufacturing process).

During reversal, the Pt/Ru regions electrolyze available water and pass the majority of the current thereby protecting/preventing Pt only regions from carbon oxidation. These areas need not be of equal size or may be larger sized in regions of the cell where partial fuel starvation events are more probable (i.e., outlet region). The areas coated with Ru should be able to carry the current being passed during reversal to prevent hot spots from forming, and not too distantly spaced to induce large in plane currents. Suggested strip width is 2 cm with 5 cm spacing (i.e., Pt strip width=5 cm).

BRIEF DESCRIPTION OF THE FIGURES OF THE DRAWING

FIG. 9 is a picture of a CCM with RuIrOx strips and Pt regions in between.

DETAILED DESCRIPTION OF THE PREFERRED EMBODIMENTS

A fuel cell comprises a membrane electrode assembly, i.e., anode, cathode and an electrolyte membrane arranged between the anode and the cathode. In order to overcome the problems inherent in reversal, such as damage to the anode due to carbon oxidation, and to achieve reversal tolerance while decreasing long term degradation due to cross-over of Ruthenium from the anode to the cathode, the present invention provides an anode with an oxygen evolution reaction catalyst. The catalyst can be any suitable metal compound, but is generally a Ruthenium compound. Among the Ruthenium compounds preferred is RuIrOx, where x can vary depending on the respective valences of Ru and Ir. The parts of the MEA that do not contain the catalyst are not expected to suffer degradation of Ruthenium cross-over, so that overall degradation of the cell will be diminished.

During reversal, the Pt/Ru regions electrolyze available water and pass the majority of the current thereby protecting/preventing Pt only regions from carbon oxidation, and limiting overall damage to the anode. The areas containing the Ruthenium compound need not be of equal size. Some areas can be larger than other areas. Those areas in the regions of the cell where partial fuel starvation events are more probable, e.g., in the outlet region of the anode, are preferably larger. The areas can also be in a pattern, such as a checkerboard or in stripes. The areas coated with the Ruthenium or a Ruthenium compound should be able to carry the current being passed during reversal to prevent hot spots from forming, and not too distantly spaced to induce larger in plane currents. For example, when using strips, the suggested strip width is about 2 cm, with up to 5 cm spacing, i.e., the Pt strip width would be about 5 cm.

The patterns can be applied to the anode, generally the gas diffusion layer of the anode, in two steps. First, the Ruthenium compound can be applied to the GDL in the desired pattern, and then the Pt catalyst can be applied to fill in between the Ruthenium compound areas, or vice-versa. Alternatively, the gas diffusion layer can be coated with the Pt catalyst, and then the Ruthenium compound applied in a pattern over the Pt catalyst layer.

By employing the reversal tolerance anode of the present invention, one can limit the damage to the anode during reversal. The limited amount of Ruthenium compound used also provide a fuel cell in which degradation to the cell because of Ruthenium cross-over is diminished. Using less precious metals also translates into less cost.

Turning now to the Figures of the Drawing, FIG. 1 shows the loss in performance associated with Ruthenium crossover from the anode to the cathode in a conventional MEA stack. This contribution to degradation was proven by comparison of degradation rate using a Pt anode structure.

Figure 2:
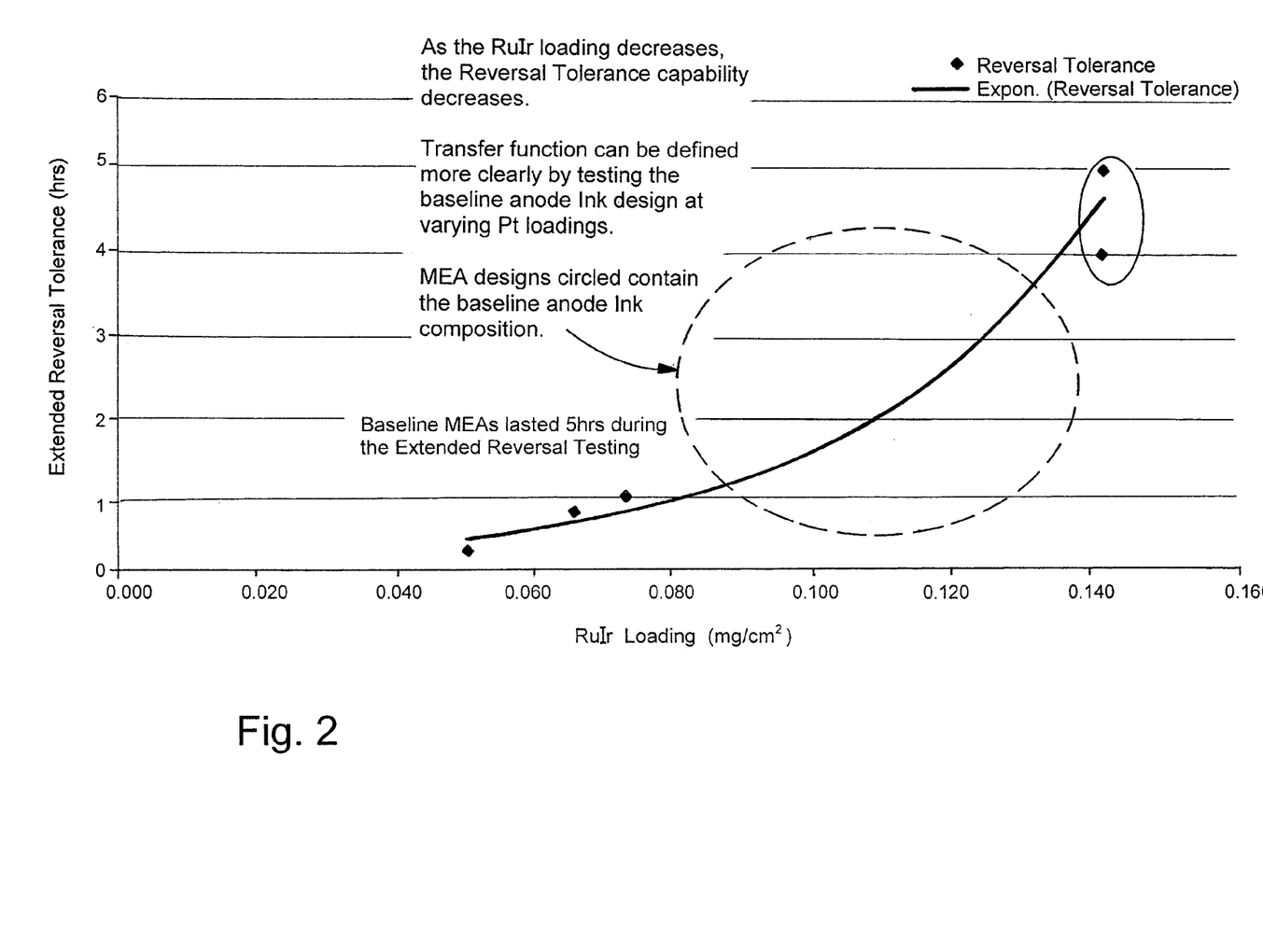
FIG. 2 graphically shows the trade-off with required reversal tolerance as a function of Ruthenium loading at the anode.

FIG. 2 shows the trade-off with required reversal tolerance as a function of Ru loading at the anode. As shown, some Ruthenium is necessary at the anode to limit the damage caused by carbon oxidation during cell reversal. Causes of reversal due to fuel starvation can occur during operation with poor flow sharing or low fuel flow. Fuel starvation can also occur during a shutdown event when the anode is purged with air (to leave the stack in a safe situation or in preparation for freeze start) and load is drawn to additionally bleed down cell voltages. Between start-up and shutdown (if $H_2$ is not purged from the anode) air will permeate into the anode and consume $H_2$ due to small leaks and/or crossover from the cathode. On the resulting start-up, the exchange of air on the anode with $H_2$ and subsequent load will result in fuel starvation at the cell outlet. The following pictures describe and show various anode concepts and prototypes which balance the requirement of reversal tolerance while minimizing overall Ru to prevent excessive degradation at the cathode.

Figure 3:
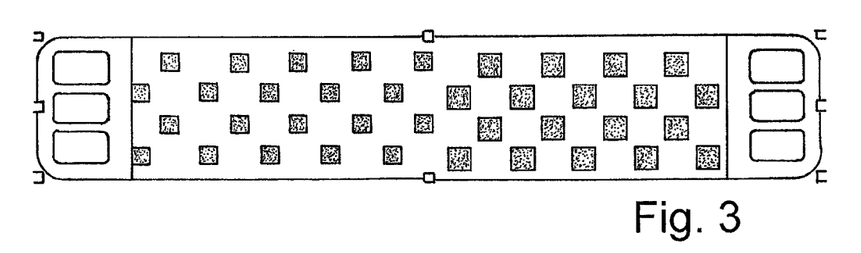
FIG. 3 shows a spotted design embodiment of the present invention.

FIG. 3 shows a spotted design concept, patches are appropriately spaced with greater area at the outlet region (Right hand side) where fuel starvation is more likely. By assumption, Ru crossover to the cathode occurs opposite to each patch. If the Ru can spread in-plane, then the spacing of each anode patch should be greater than the Ru diffusion distance but less than the distance that current can distribute in-plane.

Figure 4:
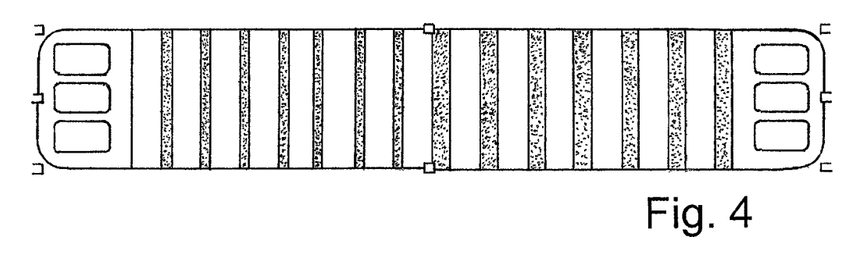
FIG. 4 shows another design embodiment of the present invention involving strips of a Ruthenium compound.

FIG. 4 shows another concept where RuIrOx patches are placed in strips.

Figure 5:
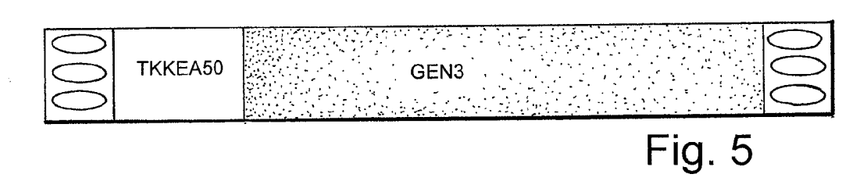
FIG. 5 is a schematic of an anode containing a Ruthenium compound coated on 75% of its area closest to the outlet.
Figure 6:
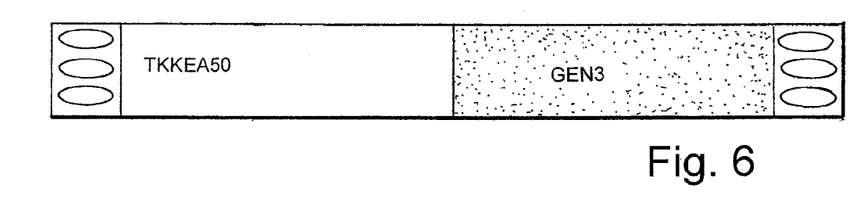
FIG. 6 is a schematic of an anode containing a Ruthenium compound coated on 50% of its area closest to the outlet.
Figure 7:
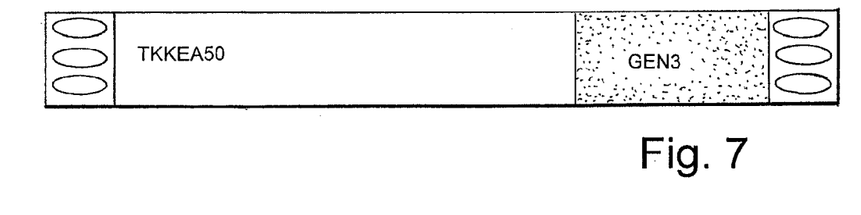
FIG. 7 is a schematic of an anode containing a Ruthenium compound coated on 25% of its area closest to the outlet.

In FIGS. 5-7 RuIrOx is localized at certain areas which may be prone to fuel starvation. RuIrOx is coated at 75%, 50% and 25% of the area close to the outlet, respectively.

Figure 8:
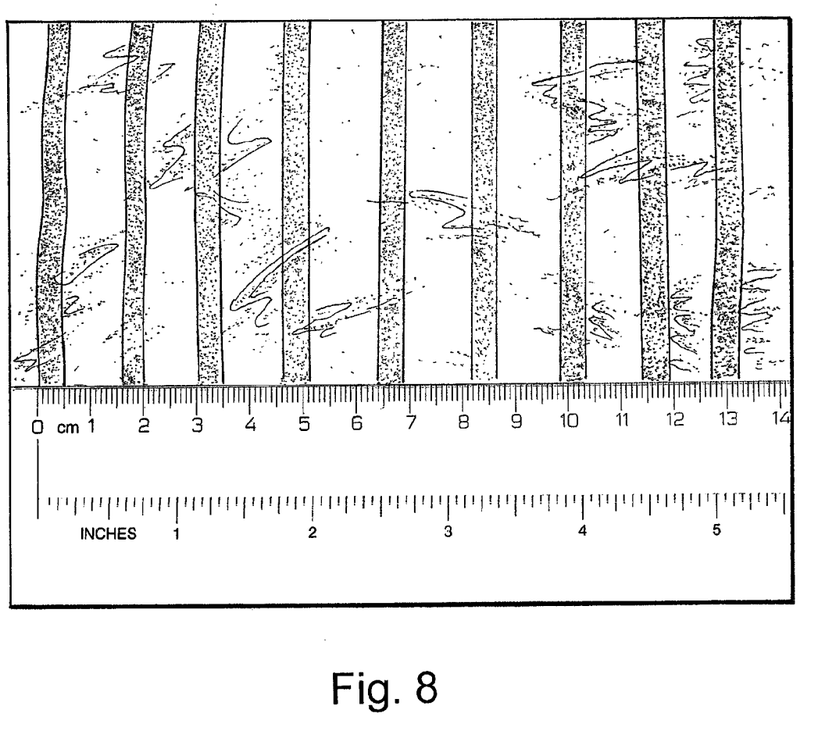
FIG. 8 is a picture of an anode mode with Ruthenium compound patches.

FIG. 8 is a picture of a prototype made with Ru patches. A subsequent decal step would fill in the uncoated region with Pt catalyst as shown in FIG. 6.

Figure 9:
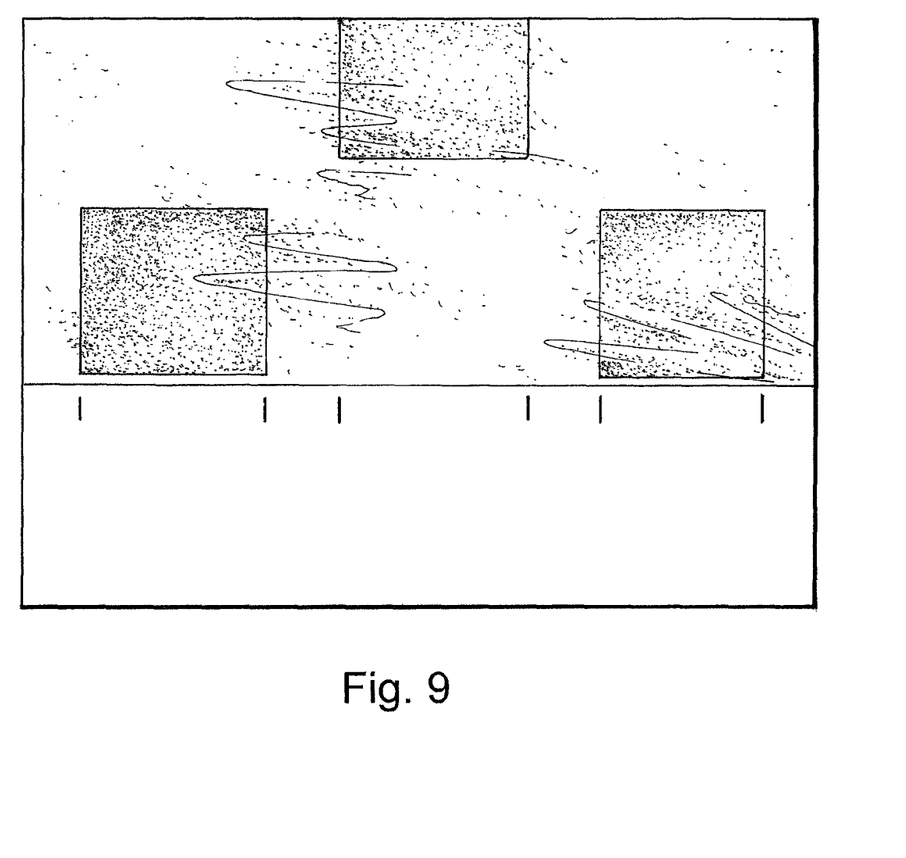
Figure 10:
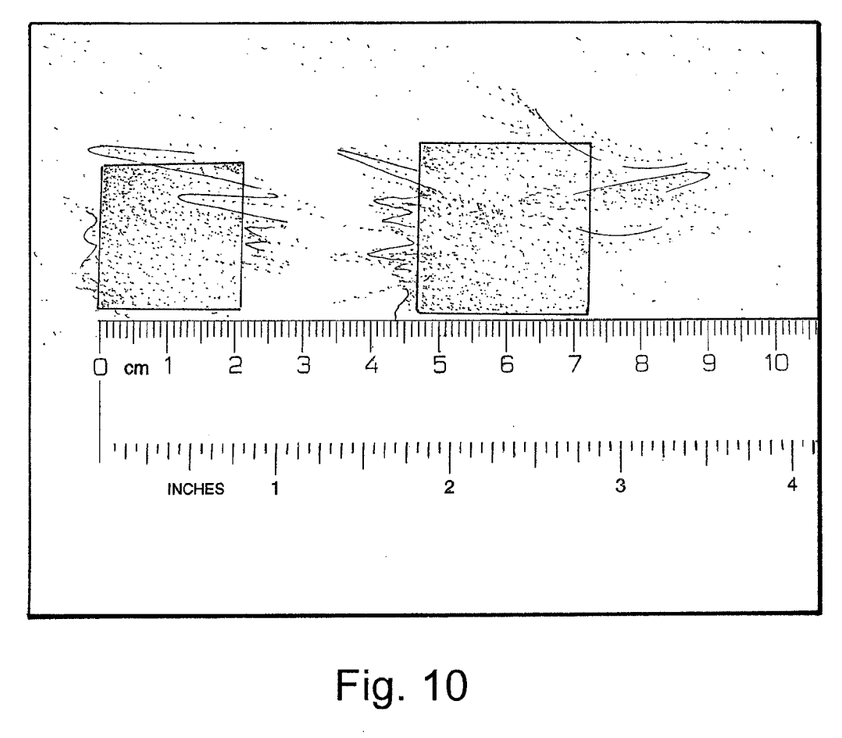
FIG. 10 is a picture of an anode with RuIrOx patches in a checkerboard pattern.

FIG. 9 shows a catalysed CCM with RuIrOx strips and Pt regions in between and FIG. 10 shows the RuIrOx in patches with a checkerboard design.

Suitable methods for making these structures include:

Coating transfer films (made of PTFE or Kynar, for example) and, with careful alignment, covering the entire area using a second or multiple decal transfer step to fill in the regions where platinum is to be filled in. (See the discussion relating to FIG. 8.) According to this method, the Ru-compound patches are applied by a first decal step, then Pt catalyst is applied by a second decal step in the remaining uncovered regions. Further decal steps are possible.

Coating a roll or coil of a gas diffusion layer (GDL), using two heads which are fed by different ink reservoirs, with wet overlap. In this case, the roll width is wide enough to accommodate the entire cell length to allow for variation in left/right coating zones. Thus, in this method, the GDL is provided in the form of a strip which is rolled up or coiled. It is preferable that the MEA components (and therefore the GDL, for example) are in the form of such rolls or coils in order to laminate and coat them in a continuous process, which serves to reduce the cost. According to this method, the GDL is unrolled from such a roll or coil, and then the catalyst regions are printed on it using two or more print heads, in a continuous process.

Coating a GDL with Pt catalyst in a first step, and subsequently applying the Ru-compound patches onto the first Pt catalyst coating layer, with an interleave and exposed window(s) (that is, a mask) in the desired pattern.

Spots or approximate squares are possible using a gravure coating head with smooth and dimpled regions on the surface of the coating head (and a wiping/doctor blade). Alternatively, the roll coating head could have raised pads appropriately spaced in the desired pattern to create the coated surface regions.

XY ink jet technology to rastor across the membrane or decal transfer in a defined/desired pattern (squares, strips or spots).

Other traditional web coating technologies in combination with the above such as a spraycoating, vapor deposition, electrospray, screenprinting, knife coating, meyer bar to suggest a few.

The pattern can be coated with all methods named above onto the GDL and the membrane and then assembled/bonded together with alignment. For example one pattern on the GDL and the negative pattern on the membrane.

While the invention has been described with reference to example embodiments thereof, it is to be understood that the invention is not limited to the described embodiments or constructions. To the contrary, the invention is intended to cover various modifications and equivalent arrangements. Different embodiments employing the concepts and teachings of the invention will be apparent and obvious to those of ordinary skill in the art and these embodiments are likewise intended to be within the scope of the claims.

What is claimed is:

1. A reversal tolerant anode for a fuel cell which comprises an oxygen evolution reaction catalyst disposed in selected areas of the anode, with only part of the anode structure containing the oxygen evolution reaction catalyst,
   wherein the selected areas are provided to the surface of the anode according to a predetermined pattern,
   wherein the predetermined pattern comprises that the selected areas are larger in size the narrower to the anode outlet they are disposed, and
   wherein the oxygen evolution reaction catalyst is comprised of a Ruthenium compound.

2. The anode of claim 1, wherein the Ruthenium compound is $RuIrO_x$ wherein x varies depending upon the respective valences of Ru and Ir.

3. A membrane electrode assembly comprising the anode of claim 1, a cathode, and an electrolyte membrane arranged between the anode and the cathode.

4. The MEA of claim 3, wherein the Ruthenium compound is $RuIrO_x$ wherein x varies depending upon the respective valences of Ru and Ir.

5. A method for preparing a reversal tolerant anode which comprises
  applying Ru-compound patches to the anode in selected areas of the anode, making the selected areas larger in size the narrower to the anode outlet they are disposed, and then
  applying a Pt catalyst by filling in the remaining regions of the anode to which Ru-compound was not applied.

6. A method for preparing a reversal tolerant anode which comprises
  coating a gas diffusion layer of an anode with Pt catalyst, and subsequently
  applying a Ru-compound onto the Pt catalyst coating in selected areas of the anode in a predetermined pattern, wherein the predetermined pattern comprises that the selected areas are larger in size the narrower to the anode outlet they are disposed.

\* \* \* \* \*